United States Patent
Kawamata

[11] Patent Number: 5,477,400
[45] Date of Patent: Dec. 19, 1995

[54] TAPE TRANSPORT SYSTEM CONTROL DEVICE

[75] Inventor: Naoki Kawamata, Kanagawa, Japan

[73] Assignee: Canon Kabushiki Kaisha, Tokyo, Japan

[21] Appl. No.: 100,121

[22] Filed: Jul. 30, 1993

[30] Foreign Application Priority Data

Aug. 6, 1992 [JP] Japan ................................. 4-231364

[51] Int. Cl.⁶ ............................................. G11B 15/43
[52] U.S. Cl. .................................. 360/73.09; 242/334.3
[58] Field of Search ............................ 360/73.09, 73.11, 360/73.04; 242/189, 190, 334.6, 334.5, 334.1, 412.2, 413.5

[56] References Cited

U.S. PATENT DOCUMENTS 5,039,027 8/1991 Yanagihara et al. ................ 242/190
5,222,684 6/1993 Yoneda et al. ...................... 242/186
5,313,343 5/1994 Yatomi ................................. 360/71

Primary Examiner—Aristotelis Psitos
Assistant Examiner—James T. Wilson
Attorney, Agent, or Firm—Robin, Blecker, Daley & Driscoll

[57] ABSTRACT

A tape transport system control device for controlling a tape transport system in which a tape payed out from a supply-side reel driven by a supply-side reel motor travels through a predetermined path to be taken up on a takeup-side reel driven by a takeup-side reel motor, includes a tape speed control servoloop for the takeup-side reel motor, a tape tension control servoloop for the supply-side reel motor, a detecting part arranged to detect a difference between a tape tension obtained on the side of the supply-side reel and a tape tension obtained on the side of the takeup-side reel, and a loop arranged to feed the detected difference of tension forward to the supply-side reel motor.

19 Claims, 2 Drawing Sheets

TAPE TRANSPORT SYSTEM CONTROL DEVICE

BACKGROUND OF THE INVENTION

1. Field of the Invention

This invention relates to a tape transport system control device for an apparatus such as a VTR (video tape recorder) having a tape transport system which is arranged to cause a magnetic tape to travel, and more particularly to a tape transport system control device arranged to control the speed and tension of the tape over a wide range of speeds in a so-called reel-to-reel state by controlling both supply-side and takeup-side reel motors without using a capstan for controlling the tape speed.

2. Description of the Related Art

In a case where a tape transport system allows the tape to travel either at a predetermined speed or within a narrow range of speeds, the tape speed can be controlled by arranging between two reels a capstan which accurately rotates at a set speed. During recent years, however, there have arisen a desire for causing the tape speed to continuously vary over a wide range and a desire for controlling the tape tension accurately at a low tension value as the tape has become thinner. To satisfy these desires, it has become necessary to adopt a method called reel-to-reel control for controlling the tape speed and the tape tension by directly controlling each of reel motors.

In controlling the reel motor, it is necessary to cope with changes taking place in radius of rotation and in inertial mass as the amount of winding of the tape around the reel varies. Various methods have been contrived for coping with the changes of the characteristic of the reel including the tape. These methods are based mainly on the characteristic of each individual reel system. However, in a tape transport system, a tape payed out from a supply-side reel reaches a takeup-side reel through a complex path, including such a load system as an impedance roller which is a rotary post arranged to be of a large inertial mass for the purpose of suppressing the unnecessary vibrations of the tape. Therefore, in performing the reel-to-reel control, even if the characteristic of one reel system is arranged to be equal to that of the other, acceleration or deceleration of the travel of the tape brings about an unbalance in tape tension between the supply reel side and the takeup reel side because of the adverse effect of the load system. As a result, either a high tension is applied to the tape or the tape tension decreases too much.

SUMMARY OF THE INVENTION

This invention is directed to the solution of the problem of the prior art described in the foregoing. It is, therefore, an object of this invention to provide a tape transport system control device which is arranged to prevent any unbalance from arising in tape tension between a tape portion on the side of a supply-side reel and another tape portion on the side of a takeup-side reel.

To attain this object, a device arranged as an embodiment of this invention to control the travel of a tape wound around a pair of reels comprises a first motor arranged to drive a first reel mount on which one of the pair of reels is mounted, a second motor arranged to drive a second reel mount on which the other of the pair of reels is mounted, first detecting means for detecting the tension of a portion of the tape being payed out from the reel mounted on the first reel mount, second detecting means for detecting the tension of a portion of the tape being taken up on the reel mounted on the second reel mount, third detecting means for detecting a traveling speed of the tape, first control means for controlling the first motor on the basis of a result of detection provided by the first detecting means, second control means for controlling the second motor on the basis of a result of detection provided by the third detecting means, and third control means for controlling the first motor in cooperation with the first control means on the basis of a difference between the results of detection provided by the first detecting means and the second detecting means.

The arrangement of the embodiment described above effectively eliminates any difference that arises in tape tension between a tape portion on the side of one reel and a tape portion on the side of the other reel when the traveling speed of the tape is accelerated or decelerated or when a disturbance takes place, so that the traveling speed of the tape can be controlled and adjusted to a target speed.

The above and other objects and features of this invention will become apparent from the following detailed description of embodiments thereof taken in connection with the accompanying drawings.

DETAILED DESCRIPTION OF THE PREFERRED EMBODIMENTS

Figure 1:
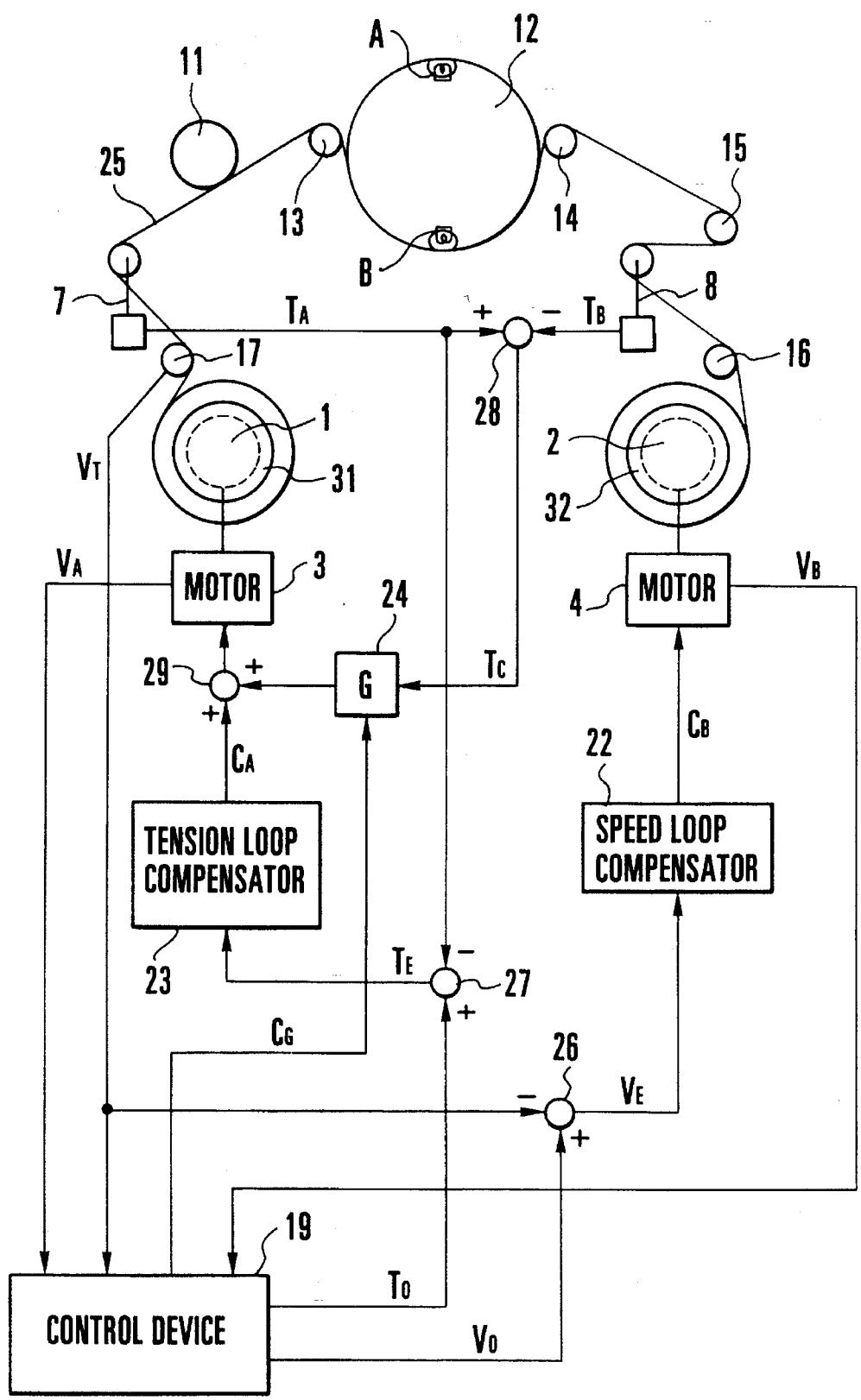
FIG. 1 is a block diagram showing one embodiment of this invention.

An embodiment (a tape transport system control device) of this invention is described with reference to FIG. 1 as follows: A supply-side reel mount 1 is arranged to permit a reel 31 to be mounted thereon. A takeup-side reel mount 2 is arranged to permit a reel 32 to be mounted thereon. A tape 25 is arranged to pass between the reels 31 and 32 while being wound therearound. A supply-side reel motor 3 is arranged to drive the reel mount 1. A takeup-side reel motor 4 is arranged to drive the reel mount 2. Each of the motors 3 and 4 is provided with a sensor for detecting its rotational angular velocity. The motors 3 and 4 are thus arranged to output rotational angular velocity signals $V_A$ and $V_B$ according to the values of rotational angular velocity detected by the sensors, respectively. These velocity values respectively correspond to the speeds of the reel mounts 1 and 2 or those of the reels 31 and 32. A supply-side tension sensor 7 is arranged to output a tension detection signal $T_A$ as a result of detection of tape tension obtained on the side of the supply-side reel 31. A takeup-side tension sensor 8 is arranged to output a tension detection signal $T_B$ as a result of detection of tape tension obtained on the side of the takeup-side reel 32. An impedance roller 11 is arranged as a rotary post. A rotary drum 12 has heads A and B mounted thereon for recording or reproducing information on or from the tape 25. Rotary or fixed posts 13, 14, 15 and 16 define the path for the tape 25. A tape speed sensor 17 is arranged to detect the traveling speed of the tape 25 and to output a speed signal $V_T$. A control device 19 which includes an arithmetic unit is arranged to output a target value To of tape tension and a target value Vo of tape speed.

A subtracter 26 is arranged to obtain a speed error signal $V_E$ from a difference between the target tape speed value Vo and the tape speed signal $V_T$. A speed loop compensator 22 is arranged to form a control signal $C_B$ for control over the takeup-side reel motor 4 according to the speed error signal $V_E$. A subtracter 27 is arranged to obtain a tension error signal $T_E$ from a difference between the target tape tension value To and the supply-side tension detection signal $T_A$. A tension loop compensator 23 is arranged to form a control signal $C_A$ for control over the supply-side reel motor 3 according to the tension error signal $T_E$.

A subtracter 28 is arranged to act as a detecting means for detecting a difference between the supply-side tension signal $T_A$ and the takeup-side tension signal $T_B$ and is arranged to output a tension difference signal $T_C$. An amplifier 24 is arranged to amplify the tension difference signal $T_C$ obtained from the subtracter 28. The gain G of the amplifier 24 is controlled by a gain control signal $C_G$ which is computed and formed by the control device 19. An adder 29 for feedforward control is arranged to add a signal outputted from the amplifier 24 to the control signal $C_A$ outputted from the tension loop compensator 23 and to apply a resultant sum signal to the supply-side reel motor 3.

In the case of the illustration of FIG. 1, the tape 25 is assumed to be traveling from the reel 31 to the reel 32. However, the traveling direction of the tape 25 is not fixed to this direction. The traveling direction of the tape 25 may be arranged to be switchable to another direction from the reel 32 to the reel 31 by rearranging the elements described above accordingly. For example, in the latter case, the device is arranged as shown in FIG. 2, which shows a second embodiment of this invention.

Figure 2:
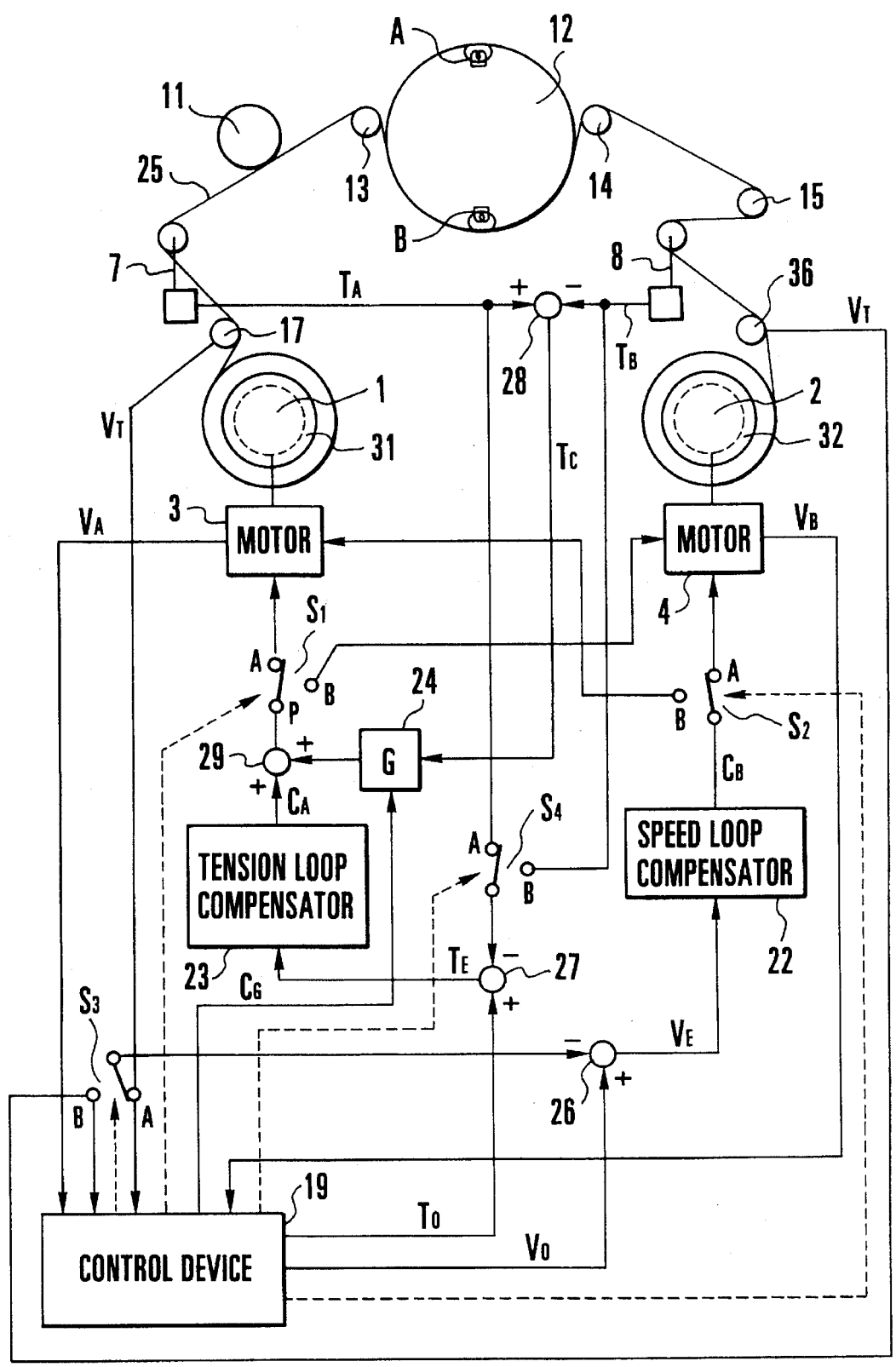
FIG. 2 is a block diagram showing another embodiment of this invention.

Referring to FIG. 2, the second embodiment is arranged to switch an output P of the adder 29, an output $C_B$ of the speed loop compensator 22 and inputs to the subtracters 26 and 27 by means of switches $S_1$, $S_2$, $S_3$ and $S_4$ according to the traveling direction of the tape 25. More specifically, when the tape 25 is traveling from the reel 31 to be taken up on the reel 32, the position of each of the switches $S_1$, $S_2$, $S_3$ and $S_4$ is shifted to one terminal A. In the case of a reverse tape traveling direction, the position of each of these switches is shifted to another terminal B. The second embodiment is provided with a speed sensor 36 for detecting the tape speed in the case of the reverse tape travel direction. The traveling direction of the tape 25 is determined within the control device 19 through the speed sensors 17 and 36. The position of each of the switches $S_1$, $S_2$, $S_3$ and $S_4$ is changed from one terminal over to the other by the control device 19 according to the result of determination. While, in the second embodiment, the speed sensors 17 and 36 are used to determine the traveling direction of the tape 25 and the position of the switch S is changed from one terminal over to the other according to the traveling direction of the tape 25 so as to select an applicable one of the speed sensors 17 and 36, the speed sensor 17 alone may be used to cope with both traveling directions of the tape 25 without the use of the speed sensor 36 and the switch $S_3$.

The tape transport system control device which is arranged according to this invention as described in the foregoing operates as follows. Referring to FIG. 1, the tape 25 payed out from the supply-side reel 31 comes to the takeup-side reel 32 through the speed sensor 17, the tension sensors 7 and 8, the impedance roller 11, the rotary drum 12, the posts 13, 14, 15 and 16. The object of tape transport system control is to maintain the speed and tension of the tape 25 at predetermined values. The object can be constantly attained by arranging the speed loop compensator 22 and the tension loop compensator 23 to stably have their loops. To suppress any unnecessary vibrations of the tape 25, the impedance roller 11 which has a large moment of inertia (substantially an equivalent mass) and other rotary posts are arranged on the path of the tape travel. If the tape speed is constant, the rotary posts which have small viscous resistances bring about no adverse effect.

However, if the traveling speed of the tape 25 involves acceleration, the adverse effect of these rotary posts cannot be ignored. The rotational speed of the takeup-side reel mount 2 increases as the target tape speed value Vo increases. In that case, therefore, the tape tension signal $T_B$ of the tension sensor 8 disposed on the side of the takeup-side reel 32 becomes larger than the tape tension signal $T_A$ of the tension sensor 7 disposed on the side of the supply-side reel 31. An unbalance in tension also takes place in the event of a disturbance. In such a case, the subtracter 28 obtains a difference between the values of the tape tension signals $T_A$ and $T_B$. A tension difference signal $T_C$ thus obtained is applied to the supply-side reel motor 3 together with a control signal $C_A$ from the tension loop compensator 23, through the amplifier 24 and the adder 29, in such a way as to diminish the difference in tension. The value (gain) of the tension difference signal $T_C$ to be applied must be determined according to the state of winding of the tape 25 around the reel 31 in the following manner.

Assuming that the value of the tape tension signal $T_A$ of the supply-side tension sensor 7 is T, the value of the tape tension signal $T_B$ of the takeup-side tension sensor 8 is $T+T_d$, i.e., with the tension difference assumed to be $T_d$, a relation between a current to be applied to the supply-side reel motor 3 and the tension value can be expressed as follows:

$$I_S = J_S(R_S^2 \cdot T/J_S + R_i^2 \cdot T_d/J_i)/(R_S \cdot K_i) \qquad (1)$$

or $$I_S = J_S(R_S^2 \cdot T/J_S + T_d/m)/(R_S \cdot K_i) \qquad (2)$$

wherein $I_S$: current value of the reel motor 3

$J_S$: moment of inertia of the reel 31 including the reel mount 1

$R_S$: radius of the reel 31 (the radius of a tape pack on the reel 31)

$K_i$: torque constant of the reel motor 3

$J_i$: moment of inertia of the impedance roller 11

$R_i$: radius of the impedance roller 11 m: equivalent mass of the impedance roller 11

The radius $R_s$ of the reel 31 and the moment of inertia $J_S$ of the reel 31 vary with the state of winding of the tape 25. However, at the control device 19, the radius $R_S$ can be calculated from the tape speed signal $V_T$ and the rotational angular velocity signals $V_A$ and $V_B$. With the data of specific gravity of the tape 25 given beforehand, the moment of inertia J can be obtained from the radius $R_S$. The tension difference $T_d$ mentioned above is removable by making the gain G of the amplifier 24 into a value expressed by the following formula, according to the formulas (1) and (2):

$$G = J_S/(R_S \cdot K_i \cdot m) \qquad (3)$$

Further, since no tension difference takes place when the tape 25 is driven at a constant speed, the steady-state characteristic of the device is never affected by the feedforward control loop added for the removal of the tension difference $T_d$.

In the case of the embodiment described, the gain G to be given to the tension difference $T_d$ is calculated from values of the radius $R_S$ and the moment of inertia $J_S$ of the reel 31. However, the state of winding of the tape 25 is presumable from a ratio between the rotational angular velocity signals $V_A$ and $V_B$ indicating the rotational speeds of the reel motors 3 and 4. Therefore, the arrangement of the embodiment may be changed to compute information on these values beforehand, to prepare and store a table which indicates the correlation of gains to ratios between the two rotational angular velocity values and to obtain the gain G from a ratio between the rotational angular velocity values by making reference to the table without any computing operation.

The embodiment described is arranged to detect a difference between tape tension obtained on the side of the supply-side reel and tape tension obtained on the side of the takeup-side reel and to feed the tension difference detected forward to the supply-side reel motor with a suitable gain. This arrangement effectively prevents an unbalance in tape tension from taking place between the tape supply and takeup sides when the traveling speed of the tape is accelerated or decelerated or in the event of occurrence of a disturbance, so that an adequate traveling state of the tape can be attained.

What is claimed is:

1. A device for controlling the travel of a tape wound around a pair of reels, comprising:

a) a first motor arranged to drive a first reel mount on which one of said pair of reels is mounted;

b) a second motor arranged to drive a second reel mount on which the other of said pair of reels is mounted;

c) first detecting means for detecting the tension of a portion of the tape being payed out from said reel mounted on said first reel mount;

d) second detecting means for detecting the tension of a portion of the tape being taken up on said reel mounted on said second reel mount;

e) third detecting means for detecting a traveling speed of the tape;

f) first control means for controlling said first motor on the basis of a difference between a result of detection provided by said first detecting means and a predetermined reference value;

g) second control means for controlling said second motor on the basis of a result of detection provided by said third detecting means; and h) third control means for controlling said first motor in cooperation with said first control means on the basis of a difference between the results of detection provided by said first detecting means and said second detecting means.

2. A device according to claim 1, wherein said third control means includes an amplifier, said amplifier being arranged to apply a predetermined gain to the difference between the results of detection provided by said first detecting means and said second detecting means.

3. A device according to claim 2, wherein said gain is set on the basis of a moment of inertia obtained on the side of said first reel mount and a radius of winding of the tape wound around said reel mounted on said first reel mount.

4. A device according to claim 3, wherein said moment of inertia is obtained on the basis of a rotational speed of said first reel mount and a traveling speed of the tape.

5. A device according to claim 2, wherein said gain is set by making reference to a table which indicates the correlation of gains with ratios between the rotational speeds of said first and second reel mounts.

6. A device according to claim 1 or 2, wherein a control value outputted from said third control means is added to a control value outputted from said first control means.

7. A device according to claim 1, further comprising a head, said head being arranged between said first and second reel mounts to record or reproduce information on or from the tape while the tape is traveling.

8. A device according to claim 7, wherein said first detecting means is disposed between said first reel mount and said head, and wherein said second detecting means is disposed between said second reel mount and said head.

9. A device according to claim 7, further comprising an impedance roller, said impedance roller being arranged between said first reel mount and said head to suppress vibrations taking place in the tape while the tape is traveling.

10. A device according to claim 9, wherein said third control means includes an amplifier, said amplifier being arranged to apply a predetermined gain to the difference between the results of detection provided by said first detecting means and said second detecting means.

11. A device according to claim 10, wherein, with a moment of inertia obtained on the side of said first reel mount assumed to be J, a radius of winding of the tape wound around said reel mounted on said first reel mount assumed to be R, a torque constant of said first motor assumed to be K, an equivalent mass of said impedance roller assumed to be m, and said gain assumed to be G, said gain G is set on the basis of the following formula:

$$G = J/(R \cdot K \cdot m)$$

12. A device according to claim 11, wherein the moment of inertia is obtained on the basis of a rotational speed of said first reel mount and a traveling speed of the tape.

13. An apparatus for recording or reproducing information on or from a tape wound around a pair of reels, comprising:

a) a first motor arranged to drive a first reel mount on which one of said pair of reels is mounted;

b) a second motor arranged to drive a second reel mount on which the other of said pair of reels is mounted;

c) a rotary drum disposed between said first and second reel mounts, said rotary drum having a plurality of heads arranged thereon to record or reproduce information on or from the tape;

d) first detecting means for detecting the tension of a portion of the tape being payed out from said reel mounted on said first reel mount;

e) second detecting means for detecting the tension of a portion of the tape being taken up on said reel mounted on said second reel mount;

f) third detecting means for detecting a traveling speed of the tape;

g) first control means for controlling said first motor on the basis of a difference between a result of detection provided by said first detecting means and a predetermined reference value;

h) second control means for controlling said second motor on the basis of a result of detection provided by said third detecting means; and i) third control means for controlling said first motor in cooperation with said first control means on the basis of a difference between the results of detection provided by said first detecting means and said second detecting means.

14. An apparatus according to claim 13, wherein said first detecting means is disposed between said first reel mount and said heads, and wherein said second detecting means is disposed between said second reel mount and said heads.

15. An apparatus according to claim 13, further comprising an impedance roller, said impedance roller being arranged between said first reel mount and said heads to suppress vibrations taking place in the tape while the tape is traveling.

16. An apparatus according to claim 15, wherein said third control means includes an amplifier, said amplifier being arranged to apply a predetermined gain to the difference between the results of detection provided by said first detecting means and said second detecting means.

17. An apparatus according to claim 16, wherein, with a moment of inertia obtained on the side of said first reel mount assumed to be J, a radius of winding of the tape wound around said reel mounted on said first reel mount assumed to be R, a torque constant of said first motor assumed to be K, an equivalent mass of said impedance roller assumed to be m, and said gain assumed to be G, said gain G is set on the basis of the following formula:

$$G = J/(R \cdot K \cdot m)$$

18. An apparatus according to claim 17, wherein the moment of inertia is obtained on the basis of a rotational speed of said first reel mount and a traveling speed of the tape.

19. An apparatus according to claim 13 or 16, wherein a control value outputted from said third control means is added to a control value outputted from said first control means.

* * * * *